Figure 1:
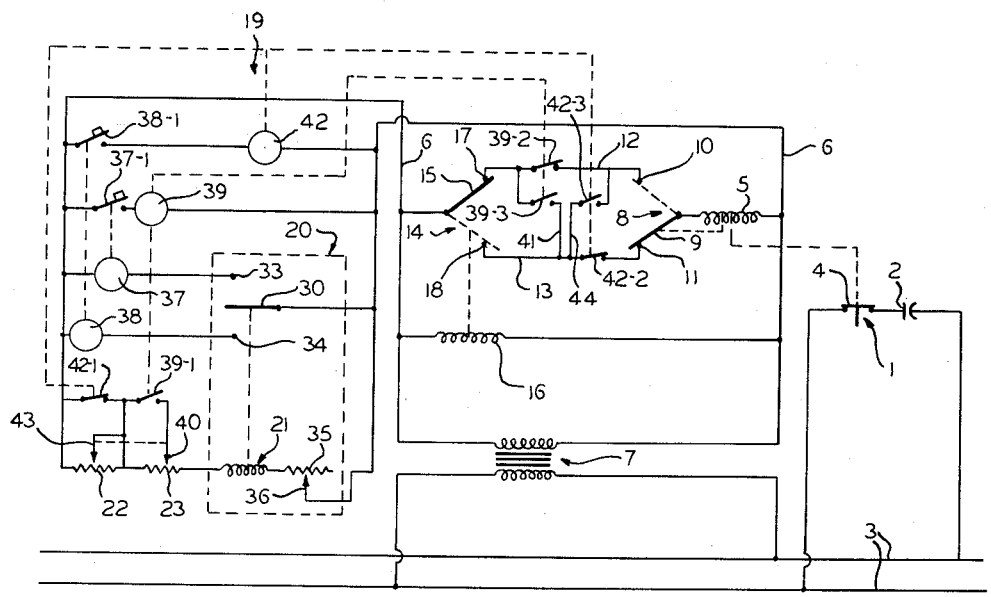

Nov. 6, 1962        D. J. J. PIRHOFER        3,063,003

AUTOMATIC CONTROL OF CAPACITOR SWITCHING

Filed May 15, 1958

INVENTOR.
DANIEL J. J. PIRHOFER
BY
Andrus + Starke
ATTORNEYS

United States Patent Office 3,063,003
Patented Nov. 6, 1962

3,063,003
AUTOMATIC CONTROL OF CAPACITOR
SWITCHING
Daniel J. J. Pirhofer, Glenview, Ill., assignor to McGraw-Edison Company, Milwaukee, Wis., a corporation of Delaware
Filed May 15, 1958, Ser. No. 735,413
13 Claims. (Cl. 323—106)

This invention relates to automatic control of capacitor switching and in particular to a combination of a normal-load conditioned responsive switch and an excessive voltage control switch for automatic switching of shunt capacitors in power circuits.

The present trend toward reactive loads on power circuits has necessitated the addition of capacitors across the distribution lines to economically compensate for the reactive demand. Generally, the load pattern on a system for each day is fairly well known. It is known to provide time switches or current sensitive switches to connect and disconnect shunt capacitors across the power line in accordance with the predetermined load pattern. Time clocks for switching provide a positive means of switching the capacitor in and out of circuit. However, the switches do not provide or compensate for unusual voltage loading during any one time cycle or period.

In accordance with the present invention, a voltage sensitive control is interconnected with a primary switching control which is responsive to a predetermined circuit condition to connect and disconnect a capacitive impedance across the power lines. The voltage sensitive control overrides the primary control to effect proper capacitor switching in the event the power line voltage varies beyond a predetermined band width about the normal line voltage.

The voltage sensitive control effects a disconnection of the capacitors in the event the line voltage is too high and the capacitors are already in the circuit, and it effects a connection of the capacitors in event the voltage is too low and the capacitors are not already in the circuit. The voltage changes required to actuate the voltage sensitive control are greater than the voltage changes which arise due to the effect of connecting or disconnecting the capacitors in the circuit. This prevents hunting of the voltage control.

The accompanying drawing illustrates the best mode presently contemplated by the inventor for carrying out the invention.

Figure 2:
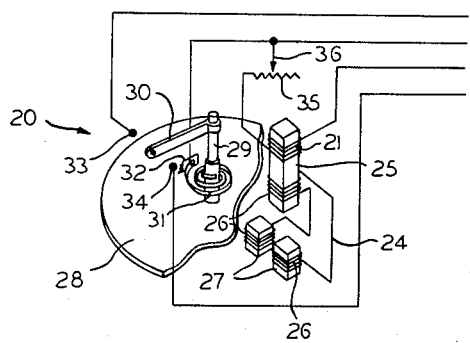

In the drawing:

FIGURE 1 is a schematic circuit showing a combined timer switch control and a voltage sensitive control for capacitor switching; and FIG. 2 is a diagrammatic illustration of a voltage responsive switch.

Referring to the drawing and particularly FIGURE 1, a set of capacitor switching contacts 1 are serially connected with a compensating capacitor 2 across a pair of power distribution lines 3. The contacts 1 are automatically controlled to connect and disconnect the capacitor 2 from across the power lines 3 to compensate for inductive loads on the power lines.

The capacitor switching contacts 1 preferably constitute a part of a capacitor switch disclosed in United States Patent 2,671,141 to W. J. Weinfurt for Switch Operating Means. As more fully disclosed in this patent, a contact member 4 is associated with the contacts 1 and alternately assumes a position closing and opening the contacts 1. A motor of which only an operating winding 5 is here shown, is suitably coupled to the contact member 4 to control the position of the contact member. The motor 5 is energized by control lines 6 which are connected across the power lines 3 through a suitable transformer 7. One side of the motor winding 5 is permanently connected to one of the control lines 6 and the other side of the motor is connected to the other control line 6 through a selector switch 8 which also constitutes a part of the capacitor switch in Patent 2,671,141. The selector switch 8 includes a switch arm 9 operatively coupled to the motor winding 5 and alternately engaging a contact 10 or a second contact 11. The selector switch arm 9 is actuated by the switch motor winding 5 and a spring means, not shown, in such a manner that just prior to a complete switching cycle by the motor, the arm 9 snaps from the contact with which it is then in engagement to the other contact as more fully described in the previously referred to Patent 2,671,141.

The contact 10 is connected in closing control line 12 which is connected to the opposite control line 6 through a first position of a clock timer switch 14 and is adapted to energize winding 5 to connect the capacitor 2 in circuit. The contact 11 is connected in an opening control line 13 which is connected to the opposite control line 6 in parallel with closing control line 12 through a second position of the clock timer switch 14 and is adapted to energize winding 5 to disconnect the capacitor 2 from the circuit.

The timer switch 14 is a single pole double throw variety having a switch arm 15 connected to the one control line 6. A motor, of which only the winding 16 is shown, is coupled to the arm 15 and moves the arm 15 to alternately engage a contact 17 in closing control line 12 or a contact 18 in opening control line 13. The timer motor is generally a conventional clock type motor and the energization of winding 16 is adapted to hold the switch arm 15 in engagement with either contact 17 or 18 during alternate periods of the day. This permits the connection and disconnection of the capacitor 2 from the circuit in accordance with a predetermined inductive loading of the power lines 3 by alternately connecting lines 12 and 13 to the motor winding 5 in synchronism with the line loading.

To compensate for voltage variations beyond an upper voltage limit or a lower voltage limit, a voltage sensitive circuit 19 is connected across the power lines 3 via control lines 6 and includes a contact making voltmeter 20 which is adapted to over-ride the effect of the timer switch 14, as presently described.

The contact making voltmeter 20 includes a voltage sensitive coil 21 which is connected across the control lines 6 in series with a first locking resistor 22 and a second locking resistor 23. The construction of the contact making voltmeter is based on the principle of a common watt-hour meter and is diagrammatically shown in FIG. 2. The voltmeter coil 21 is inductively coupled to a short circuited secondary winding 24 by a core 25. Coil 21 establishes a magnetic flux in the core 25 which creates a circulating current in the short circuited secondary winding 24. The short circuited secondary winding 24 is divided into a plurality of coils 26 one of which is wound on core 25 and the others of which are wound on separate cores 27. The core 25 is arranged in aligned and spaced relation with respect to the cores 27. A rotatable disc 28 is centrally mounted on a shaft 29 with the flux established in the cores 25 and 27 cutting the disc. The magnetic flux established in the cores 25 and 27 produces a torque in the disc 28 to angularly position a contact arm 30 which is carried by the shaft 29. A spiral spring 31 encircles the shaft 29 and has one end secured to a stationary member 32 and the other end secured to the shaft 29. The spiral spring 31 biases the shaft 29 and attached contact arm 30 in a direction opposite to that established by the torque in the disc 28 and when the two forces are equal, the disc 28, shaft 29 and arm 30 are stationary.

A pair of adjustable contacts 33 and 34 are disposed one to each side of contact arm 30 and determine the band width through which the voltage in the coil 21 may fluctuate before completing a circuit through the engagement of contact arm 30 and one of the adjustable contacts 33 and 34. A range adjusting resistor 35 is connected in series with coil 21 to adjust the current through coil 21 and bring the contact arm 30 to a center or null position midway between the contacts 33 and 34 under normal line voltage. Resistor 35 is a suitably rated rheostat having a movable connector or tap 36 to vary the amount of the resistance connected in the circuit. Thereafter, an increase in line voltage increases the torque produced in the disc 28 and rotates the disc 28 and shaft 29 against the bias of coil spring 31. If the voltage increase is sufficiently great it establishes sufficient torque in the disc 28 to rotate the contact arm 30 into engagement with contact 33. Similarly, a decrease in voltage decreases the torque produced in the disc 28 and the coil spring 31 overcomes the torque produced in the disc 28 and rotates the shaft and disc. If the voltage decrease is sufficiently great, the contact arm 30 which is carried by shaft 29 rotates into engagement with contact 34.

Referring to FIGURE 1, the contact arm 30 is connected to one control line 6 and the contacts 33 and 34 are connected in parallel to the opposite control line. As the voltage across the power lines 3 varies, the voltage across the voltmeter coil 21 also varies. If the variation is sufficiently great the arm 30 eventually effects engagement with one of the contacts 33 or 34.

A pair of time delay relays 37 and 38 are connected one each in series with the respective contacts 33 and 34. The relays 37 and 38 respectively control a set of relay contacts 37–1 and 38–1 each for purposes of illustration having its movable member or contact weighted to establish a delay in closing of the contacts due to the increased inertia. Consequently, short momentary voltage peaks and dips which may effect engagement of arm 30 and contact 33 or 34 are ineffectual to establish a switching cycle controlled by the respective relays.

The time delay relay 37 controls the set of normally open contacts 37–1 which are connected in series with a control relay 39. The contacts 37–1 close after a predetermined period of energization of relay 37 and complete the energizing connection of the control relay 39.

The control relay 39 controls a first set of contacts 39–1 which are normally open and connected in parallel with a portion of the locking resistor 23 by a movable tap 40. When the contacts 39–1 close they short out a portion of the resistor 23 and thereby increase the voltage applied to the coil 21. This increase in voltage locks the arm 30 into engagement with the associated contact 33. The contacts 39–1 are connected to resistor 23 through the tap 40 to permit variations in the value of the resistance which is shorted from the circuit. This permits adjustment in the change in voltage level applied to coil 21 due to closing of contacts 39–1. The disconnection of a capacitor from the power lines results in a decrease in the line voltage while the connection of a capacitor to the lower lines results in an increase in the line voltage. The amplitude of the variation in line voltage is dependent upon the size of the capacitor. Therefore, by suitable adjustment of tap 40 in accordance with the size of the capacitor the decrease in resistance in the circuit resulting from closing contacts 39–1 is such that it prevents the change in line voltage as a result of capacitor switching from reversing the effect of the control relay 39 and thereby eliminates hunting of the voltage control.

The control relay 39 controls a second set of control contacts 39–2 which are normally closed and maintain line 12. In the event of an abnormal voltage increase, contacts 39–2 open and break control line 12.

Simultaneously, the control relay 39 actuates a set of normally open contacts 39–3 in a jumper lead 41 which connects the time switch contacts 17 directly to control line 13.

The timer switch arm 15 and selector switch arm 9 are in the full line position in the drawing after the capacitor 2 is connected in circuit and in the event contacts 39–3 close a circuit is established energizing the motor winding 5 as follows: left hand line 6, switch arm 15 and associated contact 17, contacts 39–3 in jumper lead 41 to line 13, contact 11 in line 13, selector switch arm 9 and motor winding 5. The motor winding 5 is now energized and completes a cycle of operation to open the associated capacitor switching contacts 1 and thereby disconnect the capacitor 2 from the circuit. This decreases the line voltage.

If the voltage source decreases below the lower voltage limit, the torque produced in the disc 28 by the voltmeter coil 21 is so reduced that the spring 31 rotates contact arm 30 into engagement with contact 34. The time delay relay 38 is then connected through contact 34 and contact arm 30 in a complete circuit across control lines 6. The relay 38 closes the set of normally opened contacts 38–1 after a predetermined period of relay energization. A second control relay 42 is connected in series with the contacts 38–1 across the control lines 6. The control relay 42 opens a set of normally closed contacts 42–1 which are connected in parallel with the locking resistor 22. When contacts 42–1 open, the resistor 22 is connected in circuit and decreases the voltage impressed across the coil 21. This further decrease in voltage on coil 21 locks arm 30 to contact 34. The resistor 22 is connected in circuit through a tap 43 which is permanently connected to the junction of resistors 22 and 23. The movable tap 43 is employed to adjust the resistance connected into the circuit when contacts 42–1 open to correspond with the size of the capacitor 2 generally similarly to adjustment of tap 40 for the control action of contacts 39–1. Therefore, the line voltage variation incident to connection of the capacitor 2 in the circuit as a result of energizing control relay 42 is insufficient to actuate coil 21 in a reverse or capacitor disconnecting direction.

The taps 40 and 43 are preferably ganged, as shown, to establish a symmetrical voltage variation band width about the normal line voltage.

The control relay 42 controls a set of normally closed contacts 42–2 serially connected in opening control line 13. An abnormally low voltage results in opening of contacts 42–2 and breaks opening control line 13. This prevents completion of the disconnection circuit thorugh line 13 and the timer switch 14.

The control relay 42 simultaneously actuates a set of normally open contacts 42–3 which are connected in a jumper lead 44 connecting line 12 and 13 to the timer switch side of contacts 42–2. When contacts 42–3 are closed and the capacitor 2 is disconnected from the power lines 3 with switch arms 9 and 15 disposed in the dotted line position as shown in FIG. 1, a circuit to the capacitor switch motor winding 5 is completed via the closing control line 12, as follows: Left hand line 6, switch arm 14, and associated contact 18, contacts 42–3 in jumper lead 44, line 12 and contact 10, selector switch arm 9 and motor winding 5. The motor then operates to close the associated contacts 1. The capacitor 2 is connected in circuit when the contacts 1 close and the main line voltage increases accordingly.

The combined switching control of timer switch 14 and the contact making voltmeter 20 is described as follows:

First, assume that normal line voltage is maintained and a period of heavy reactive loading exists. The timer switch 14 presently holds arm 15 in engagement with contact 17 in line 12. Switch arm 9 of selector switch 8 is engaged with contact 11 in line 13 having moved from contact 10 in line 12 in response to previous completion of a cycle of energization to winding 5 which moved member 4 to close contacts 1. Capacitor 2 is then in circuit across power line 3 to compensate for the reactive loading. The timer winding 16 continues to effect engagement of timer arm 15 and contact 17 until some predetermined time when the power lines 3 are normally no longer reactive loaded to any great extent. At that time, arm 15 disengages contact 17 and engages contact 18 in line 13 as shown by the dotted line position of arm 15. This then completes a circuit to winding 5 as follows: starting with left hand control line 6, switch arm 15 and contact 18 of timer switch 14, line 13 to contact 11 and contact arm 9 of selector switch 8, and motor winding 5 to the opposite control line 6. Motor winding 5 then completes a cycle of operation and moves contact member 4 to assume a position opening contacts 1. Simultaneously, with the completion of a cycle of motor operation, the switch arm 9 disengages contact 11 and engages contact 10 as shown by the dotted line position of arm 9. This opens the circuit just described to motor winding 5 and stops further movement of contact member 4.

The capacitor 2 is then normally disconnected from the power lines 3 until timer motor winding 16 drives switch arm 15 into engagement with contact 17 in line 12 and completes the circuit to winding 5 via control line 12 and the switch arm 9 which is then in the dotted line position.

Now assume a period of reactive loading with the contacts 1 closed to connect the capacitor 2 across the power lines 3 and the switch arms 15 and 9 in full line position. Assume further that the line voltage increases substantially above normal. This increased line voltage is reflected in the control lines 6 and consequently across the circuit for the coil 21 as follows: starting with left hand control line 6 of circuit 19, normally closed contacts 42–1, resistor 23, coil 21 and a portion of resistor 35 and tap 36 to the right hand control line 6 of circuit 19. The increased voltage increases the current through coil 21 which establishes an increased torque in disc 28. The increased torque rotates disc 28 and attached contact arm 30 toward contact 33 and, assuming a sufficiently increased voltage, effects engagement of arm 30 and contact 33.

When arm 30 and contact 33 engage, the time delay relay 37 is energized. If the voltage persists for a period longer than the delay period of relay 37, the relay contacts 37–1 close and complete the circuit through control relay 39.

Relay 39 closes the associated contacts 39–1 to by-pass a portion of the latching or sealing resistor 23 and thereby increase the voltage impressed on coil 21. Consequently, coil 21 holds contacts 33 and arm 30 engaged until the line voltage decreases somewhat more than the rise which results from capacitor disconnection.

Relay 39 simultaneously opens the relay contacts 39–2 in control 12 and closes relay contacts 39–3 in jumper lead 41 in the normal timer switching circuit.

Normally open relay contacts 39–3 in jumper lead 41 are closed and connect line 12 to line 13 and thus connect winding 5 across the control lines 6. The motor winding 5 then operates to move the contact member 4 to assume a position opening contacts 1. The capacitor 2 is then disconnected from across the power lines 3. Switch arm 9 snaps to the dotted line position engaging contact 10. However, relay contacts 39–2 have opened and prevent capacitor connecting switching via line 12.

As a result of disconnection of the capacitor 2, the line voltage drops somewhat and consequently the voltage impressed on coil 21 drops proportionately. However, the preceding disconnection of the seal-in resistor 23, by the closing of contacts 39–1, resulted in a voltage rise impressed on coil 21 which is larger than the decrease in voltage incident to disconnection of the capacitor 2. Therefore, the contact arm 30 is not released from contact 33. If the line voltage decreases sufficiently, the contact arm 30 disengages contact 33 to successively drop out relay 37 and relay 39.

Relay contacts 39–1 then open to return coil 21 of contact making voltmeter 20 to standby operation. Relay contacts 39–3 open to break the reverse switching connection between lines 12 and 13. Relay contacts 39–2 close and complete line 12 which then effects energization of switch motor winding 5 as the timer switch arm 15 is now in a full line position and the selector switch arm 9 is in a dotted line position.

The energization of winding 5 initiates a cycle of operation which moves contact member 4 to close contacts 1 and reconnect the capacitor 2 across the lines 3. At the end of the switching cycle, selector switch arm 9 snaps to a full line position engaging contact 11 and the control circuit is then again in a normal operating condition.

If during a period of abnormally high voltage, which has resulted in the previously described disconnection of capacitor 2, the timer 14 should move arm 15 to the dotted line position engaging contact 18 in line 13, the relay contacts 39–2 are open and prevent completion of a circuit via the jumper lead 41 to winding 5. The capacitor 2 is already disconnected from the power lines 3 and thus in the desired state.

Should the voltage now drop below the lower voltage limit, the relay 39 is released and contacts 39–1 and 39–3 open while the contacts 39–2 close to return the control circuit to normal standby. The switch arms 15 and 9 are in the dotted line position which is the normal position assumed after normal disconnection of the capacitor 2 by normal functioning of timer 14.

A decrease in line voltage is proportionately applied to coil 21 of the contact making voltmeter 20. As the impressed voltage on coil 21 decreases, the torque established in disc 28 decreases and the spiral spring 31 rotates shaft 29 and the attached arm 30 toward contact 34. If the line voltage drop is sufficient, the arm 30 engages contact 34 and completes the circuit through time delay relay 38. If the voltage drop continues for the delay period of the time delay relay 38, the associated relay contacts 38–1 close and energize control relay 42.

Control relay 42 when energized opens the set of normally closed contacts 42–1 and opens the by-pass or short circuit across resistor 22 which is then operatively connected in series circuit with the coil 21. A portion of the decreased voltage across control lines 6 now appears across latching or sealing resistor 22 and consequently a lower voltage appears across the coil 21. This latches contact arm 30 and contact 34 in engagement in the same manner as the sealing resistor 23 locks the contact arm 30 to contact 33, as previously described.

Simultaneously with the closing of relay contacts 42–1, the relay contacts 42–2 in control line 13 open and the relay contacts 42–3 in jumper line 44 close.

The opening of relay contacts 42–2 prevent energization of winding 5 through contact 11 as did contacts 39–2 prevent the energization through contact 10. Therefore, as long as the abnormally low line voltage persists, winding 5 can only be energized via line 12.

The closing of relay contacts 42–3 connects lines 12 and 13 to directly connect contacts 10 and 18 in the respective lines. This then completes the connection of switch winding 5 across the control line 6 in series with the switch arms 9 and 15 which are in the dotted line position in engagement with the respective contacts 10 and 18. The winding 5 is energized to complete a switching cycle and moves the contact member 4 to close the contacts 1 and thereby connect capacitor 2 across the power lines 3. At the end of the cycle, switch arm 9 snaps to the full line position engaging contact 11.

The control circuit then functions in the same general manner as an increased voltage which increases beyond the band width limit.

Thus, the timer switch 14 operates to actuate the capacitor switch to open and closed positions in accordance with the predetermined time load pattern. However, in the event the voltage increases or decreases beyond a predetermined band width the voltmeter coil 21 is actuated to reverse the effective connection of the timer switch. The auxiliary control of coil 21 is responsive to voltage changes in excess of a predetermined band width to compensate for the connection or disconnection of the capacitors in the circuit by reversing the load determined circuit connection of the associated capacitor.

The over-riding auxiliary control may be employed with suitable current sensitive means as well as timer switch means and thereby affect a normal switching and an over-riding compensating switching.

The present invention provides reliable over-riding switching to compensate for the effects of capacitor compensating loading.

Various modes of carrying out the invention are contemplated as being within the scope of the following claims particularly pointing out and distinctly claiming the subject matter which is regarded as the invention.

I claim:

1. In a capacitor switching system for automatically completing and breaking a capacitive circuit connected to a power circuit, means to alternately complete and break the capacitive circuit in accordance with predetermined non-voltage conditions, circuit switching means responsive to a predetermined line voltage variation to reverse the conductive condition of the capacitive circuit if the condition of the capacitive circuit is effecting the line voltage in the same direction as the predetermined voltage variation, and means responsive to actuation of said last named means to latch in said circuit switching means until an increased opposite voltage variation is established in excess of that established by capacitive circuit switching whereby switching of the capacitive circuit prevents establishment of a voltage variation to actuate said circuit switching means.

2. In a capacitor switching system for automatically connecting and disconnecting a capacitor to electric power lines, switch means having a first position connecting the capacitor to the power lines and having a second position disconnecting the capacitor from the power lines, said switch means being automatically responsive to predetermined non-voltage conditions to alternately assume said first and second positions, voltage sensitive means responsive to predetermined power line voltage variations to operatively reverse the switching effect of said switch means, and means responsive to actuation of said voltage sensitive means to increase the voltage variation applied to said voltage sensitive means and thereby prevent actuation of the voltage sensitive means by a line voltage variation arising from said reverse switching effect.

3. In a switching system for a capacitor having switch means to connect it to and disconnect it from an alternating current power circuit, control means having a pair of alternately actuated branch circuits for automatically selectively actuating said switch means in accordance with a predetermined condition to connect and disconnect the capacitor, a contact making voltmeter having a voltage coil energized from said circuit and having a first switching position corresponding to a predetermined increase in circuit voltage and a second switching position corresponding to a predetermined decrease in circuit voltage, relay means having contact means interconnecting said branch circuits and controlled by the first and second switching positions of said contact making voltmeter to reverse the sequential actuation of the branch circuits and to establish a secondary overriding control of said switch means directly responsive to the condition of the circuit voltage.

4. In a control system for a capacitor having switch means provided with a pair of control leads and operable in response to electrical signals received alternately over said control leads to connect and disconnect said capacitor from a power circuit, a time switch having a single-pole double-throw contact for alternately connecting said power circuit to said control leads, a contact making voltmeter having a voltage sensitive coil energized from said power circuit and having a first switching position corresponding to a predetermined increase in circuit voltage and a second switching position corresponding to a predetermined decrease in circuit voltage, and relay means controlled by said contact making voltmeter and adapted to reverse the connection between the contacts of said time switch and said control leads when said contact making voltmeter is in said first or said second switching positions.

5. In a switching system for a capacitor having switch means to connect it to and disconnect it from an alternating current power circuit, means for automatically selectively controlling said switch means in accordance with a predetermined non-voltage condition, a contact making voltmeter having a voltage coil energized from said circuit and having a first position corresponding to a predetermined increase in circuit voltage and a second position corresponding to a predetermined decrease in circuit voltage, relay means interposed between said control means and said switch means and controlled by said contact making voltmeter for rendering said control means ineffective and for selectively controlling said switch means when said contact making voltmeter is in said first or said second position, and means controlled by said contact making voltmeter for respectively lowering or raising said voltage impressed on said coil when said contact making voltmeter occupies said first or said second position, the change in voltage impressed on said coil resulting from operation of said last named means being greater than the change in circuit voltage incident to connection or disconnection of said capacitor from said power circuit.

6. A capacitor switching system for automatically connecting and disconnecting a capacitor from a line circuit in response to load characteristics and to line voltage variations, which comprises electrically operated switch means adapted to selectively connect and disconnect a capacitor to the line circuit in response to an incoming signal, a first switch means responsive to predetermined loading characteristics to alternately assume a first and a second circuit closing position, a second switch means responsive to a cycle of operation of said electrically operated switch to alternately assume a first and a second circuit closing position, a first control branch including said first switch means and said second switch means in said first position, a second control branch including said first switch means and said second switch means in said second position, control power lines, said first control branch and said second control branch being parallel connected in series with said electrically operated switch means across said control power lines to establish a signal to said switch means when the first and second named switch means simultaneously assume a circuit closing position to one control branch, normally closed relay contact serially connected in said first control branch, a second set of normally closed relay contacts serially connected in said second control branch, a first set of normally open relay contacts adapted to connect said control branches between said first switch means and said normally closed relay contacts, a second set of normally open contacts adapted to connect said control branches between said first switch means and said second set of normally closed relay contacts, first relay means responsive to a predetermined increased line voltage to hold said first set of normally closed contacts open and said first set of normally open contacts closed to reverse the switching function of said second control branch and to open said first control branch, relay means responsive to a predetermined decreased line voltage to hold said second set of normally closed contacts open and said second set of normally open contacts closed to reverse the switching function of said first control branch and to open said second control branch, and seal-in means responsive to a relay actuating voltage to increase the voltage variation applied to the relay means to increase the opposite voltage variation required to release said relay means and thereby eliminate releasing of said relay means in response to line voltage variations due to the reverse functioning of said control branches.

7. A capacitor switching system for automatically connecting and disconnecting capacitors from a line circuit in response to load characteristics and to line voltage variations, which comprises switching means having a first position and a second position and being actuated in accordance with predetermined load characteristics to respectively selectively directly connect and disconnect the capacitors from the line circuit to compensate for the load characteristic, voltage sensitive means connected across said line circuit and operatively associated with said switching means to interchange the operation of said switching means in response to predetermined increase line voltage and to predetermined decrease line voltage, and voltage adjusting means serially connected with said voltage sensitive means across said line circuit and responsive to actuation of the voltage sensitive means to change the voltage applied to the voltage sensitive means in the same direction as the line voltage variation actuating the voltage sensitive means.

8. In a capacitor switching circuit for connecting capacitors to a power line to compensate for reactive loading, a switching circuit having a first control branch circuit to connect the capacitors to the power line and having a second control branch circuit to disconnect the capacitors from the power line, means actuated in accordance with a predetermined reactive loading to actuate the switching circuit to selectively complete one of said control branch circuits, voltage sensitive means connected across said power lines and actuated in accordance with predetermined voltage variations from a normal power line voltage, first circuit control means operatively associated with said voltage sensitive means and actuated in response to a voltage variation above said normal voltage, said first circuit control means being operatively associated with the control branches to interchange the operation of the control branches, a second circuit control means operatively associated with said voltage sensitive means and actuated in response to a voltage variation below the normal voltage, said second circuit control means being operatively associated with the control branches to interchange the operation of the control branches, and a voltage adjusting circuit serially connected with said voltage sensitive means across the power lines and including means responsive to actuation of said circuit control means to increase the effective voltage variation applied to the voltage sensitive means and prevent actuation of the voltage sensitive means in response to line voltage variations arising from the interchanging of the operation of the control branch circuits.

9. A capacitor switching system for automatically connecting and disconnecting capacitors across electrical lines, which comprises electrically driven switch means to connect and disconnect the capacitors from across the power lines, a switching circuit connecting said driven means to a source of power and having a first branch circuit adapted to drive the switch means to a capacitor connecting position and having a second branch circuit adapted to drive the switch means to a capacitor disconnecting position, means actuated in accordance with a predetermined reactive load condition to selectively complete said branch circuits, voltage sensitive means operatively connected across said lines and having first contact means actuated in response to a predetermined increased line voltage and having second contact means actuated in response to a predetermined decreased line voltage, electromagnetic means serially connected with said first contact means to a source of power, switch means operatively actuated by the electromagnetic means and operatively connected to said branch circuits to reverse the operation of the branch circuits, second electromagnetic means serially connected with said second contact means to a source of power, second switch means connecting said branch circuits and operatively associated with said second electromagnetic means to reverse the operation of the branch circuits, a voltage adjusting network including an impedance device serially connected with said voltage sensitive means across the lines, latch switch means adapted to disconnect a portion of the impedance device from said series connection to thereby increase the voltage impressed on said voltage sensitive means, said latch switch means being operatively associated with said first named electromagnetic means to latch the voltage sensitive means in circuit in response to a high voltage actuation of the voltage sensitive means, and second latch switch means normally by-passing a portion of impedance device, and adapted to operatively connect the by-passed impedance device in said series connection, said second latch switch means being operatively associated with said second named electromagnetic means to latch the voltage sensitive means in circuit in response to a low voltage actuation of the voltage sensitive means.

10. A capacitor switching system for automatically connecting and disconnecting capacitors across power lines, which comprises electrically controlled switch means to connect and disconnect the capacitors from the power lines, a switching circuit connecting said electrically controlled switch means to a source of power and having a first branch circuit actuating said switch means to connect the capacitor in circuit and having a second branch circuit actuating said switch means to disconnect the capacitor from circuit, voltage sensitive means connected across said power lines and having first contact means actuated to a circuit completing condition in response to a predetermined increased line voltage and having second contact means actuated to a circuit completing condition in response to said predetermined increased voltage, a first electromagnetic means serially connected with said first contact means to a source of power to energize said electromagnetic means in response to said predetermined increased voltage, switch means operatively associated with said first electromagnetic means and with said branch circuits to reverse the operation of said branch circuits in response to said predetermined increased voltage, a second electromagnetic means serially connected with said second contact means to a source of power to energize said second electromagnetic means in response to said predetermined decreased voltage, switch means operatively associated with said second electromagnetic means and with said branch circuits to reverse the operation of said branch circuits, and an automatic voltage adjusting circuit serially connected with said voltage sensitive device and having switch means operatively associated with said first and second electromagnetic means to increase the actuating voltage variation applied to the voltage sensitive means in response to the respective actuation of the first and second electromagnetic means.

11. A capacitor switching system for automatically connecting and disconnecting a capacitor from a line circuit in response to load characteristics and to line voltage variations, which comprises electrically operated switch means adapted to alternately connect and disconnect a capacitor to the line circuit, a first switch means responsive to predetermined loading characteristics to alternately assume a first and a second circuit closing position, a second switch responsive to a cycle of operation of said electrically operated switch means to alternately assume a first and a second circuit closing position, a first control branch including said first switch means and said second switch means in said first position, a second control branch including said first switch means and said power lines, said first control branch and said second control branch being parallel connected in series with said electrically operated switch means across said control power lines to energize said electrically operated switch means when the first and second named switch means simultaneously assume a circuit closing position in one control branch, circuit switching means adapted to effectively short circuit said first switch means and to open one of said control branches to operatively reverse the normal switching state of said control lines, and voltage sensitive means operatively connected to said line circuit to actuate said circuit switching means in response to a predetermined line voltage variation.

12. A capacitor switching system for automatically connecting and disconnecting a capacitor from a line circuit in response to load characteristics and to line voltage variations, which comprises an electrically controlled switch means adapted to alternately connect and disconnect a capacitor to the line circuit in response to an electrical signal, a first switch means responsive to predetermined loading characteristics to alternately assume a first and a second circuit closing position, a second switch means responsive to a cycle of operation of said electrically controlled switch means to alternately assume a first and a second circuit closing position, a first control branch including said first switch means and said second switch means in said first position, a second control branch including said first switch means and said second switch means in said second position, control power lines, said first control branch and said second control branch being parallel connected in series with said electrically controlled switch means across said control power lines to actuate said electrically controlled switch means when the first and second named switch means simultaneously assume a circuit closing position in either control branch, short-circuiting switch means adapted to effectively short circuit said first named switch means, normally closed switch means in said first branch circuit intermediate said short-circuiting switch means and said second named switch means, normally closed switch means in said second branch circuit intermediate said short-circuiting switch means and said second named switch means, over-voltage means responsive to a predetermined increased line voltage to actuate said short-circuiting switch means and to open one of said normally closed switch means to establish a capacitor to line connection tending to connect said increased line voltage, and under-voltage means responsive to a predetermined decreased line voltage to actuate said short-circuiting switch means and to open the other of said normally closed switch means to establish a capacitor to line connection tending to correct said decreased line voltage.

13. In combination, an alternating current power system, a capacitor, switch means for connecting said capacitor to and disconnecting said capacitor from said power system, control means for selectively controlling said switch means in accordance with a predetermined condition, a contact making voltmeter having a voltage coil energize from said circuit and having first and second positions corresponding to a predetermined increase and decrease respectively in circuit voltage, relay means disposed between said control means and said switch means and controlled by said contact making voltmeter for disabling said control means and for selectively controlling said switch means when said contact making voltmeter is in said first or said second positions, first and second impedances connected in series with said voltage coil, said relay means normally short circuiting said first impedance and being adapted to remove said short circuit when said contact making voltmeter is in said first position and said relay means further being adapted to short circuit said second impedance when said contact making voltmeter is in said second position, and means for simultaneously adjusting the impedance of said first and second impedances.

References Cited in the file of this patent
UNITED STATES PATENTS

| | | |
|---|---|---|
| 1,915,095 | Jump | June 20, 1933 |
| 2,666,860 | Weinfurt | Jan. 19, 1954 |
| 2,689,937 | Cuttino | Sept. 21, 1954 |

UNITED STATES PATENT OFFICE
CERTIFICATE OF CORRECTION

Patent No. 3,063,003 November 6, 1962

Daniel J. J. Pirhofer

It is hereby certified that error appears in the above numbered patent requiring correction and that the said Letters Patent should read as corrected below.

Column 4, line 3, for "time" read -- timer --; line 51, for "thorugh" read -- through --; column 10, line 40, for "said predetermined increased" read -- a predetermined decreased line --.

Signed and sealed this 9th day of April 1963.

(SEAL)
Attest:

ESTON G. JOHNSON
Attesting Officer

DAVID L. LADD
Commissioner of Patents